Sept. 29, 1942.    F. W. SCHLICHTER    2,297,078
DRILL PRESS
Filed June 15, 1940    4 Sheets-Sheet 2
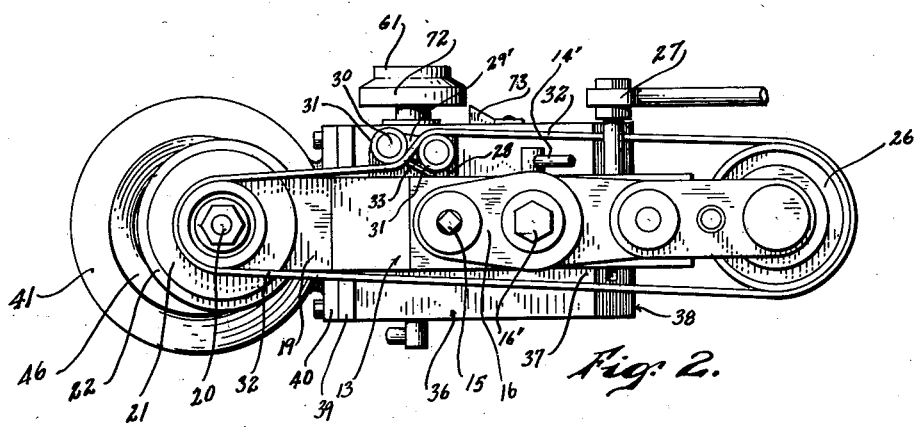
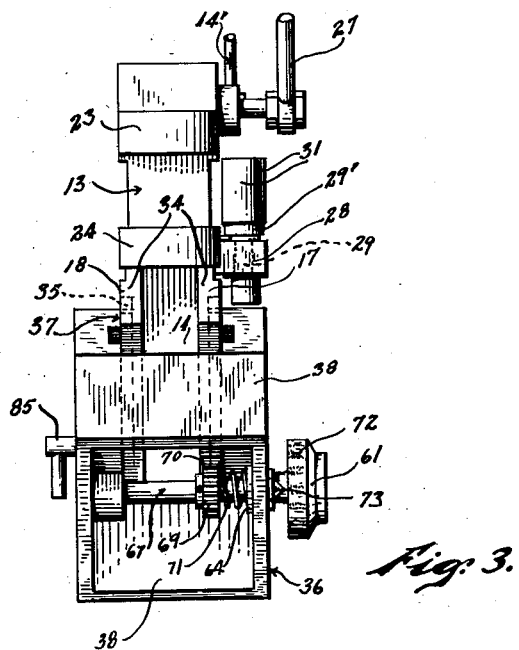
INVENTOR:
FRED W. SCHLICHTER,
BY:
Horace S Woodward
ATTORNEY.

Sept. 29, 1942.　　F. W. SCHLICHTER　　2,297,078
DRILL PRESS
Filed June 15, 1940　　4 Sheets-Sheet 3

INVENTOR:
FRED W. SCHLICHTER,
BY: Horace S Woodward
ATTORNEY

Sept. 29, 1942. F. W. SCHLICHTER 2,297,078
DRILL PRESS
Filed June 15, 1940 4 Sheets-Sheet 4

INVENTOR:
FRED W. SCHLICHTER,
BY:
Horace Woodward
ATTORNEY

Patented Sept. 29, 1942

2,297,078

UNITED STATES PATENT OFFICE 2,297,078

DRILL PRESS

Frederick W. Schlichter, Hamilton, Ohio, assignor to The Hamilton Tool Company, Hamilton, Ohio, a corporation of Ohio Application June 15, 1940, Serial No. 340,795

3 Claims. (Cl. 77—29)

The invention relates to drill presses, and particularly to drill presses with an infinite range of ratio of speed between the driving member and the chuck spindle, having special value in those devices in which an electric motor is utilized to drive the chuck spindle.

A further important aim is to present an unusually compact construction in such a device enabling the attainment of a full range of speed between wide limits of minimum and maximum, and enabling the variation of the ratio of speed between the drive and the chuck spindle with great ease and certainty.

It is also an aim to coordinate in a novel way a chuck spindle and cone driving device to the end that the area of frictional contact between the elements will increase progressively from high speed position to low speed position, this having peculiar value in such machines because of the fact that a minimum of power is required with high speed operations where small drills are employed, but low speeds are necessary where large drills are required, and where a greater amount of power must be transmitted to the drill.

Another object is to present a novel and very compact means for attaining the combined function of maintaining the two cone elements in contact in such a device as here disclosed, and also absorbing shocks and vibrations tending to be transmitted from the motor, so that these are not manifest at the contact between the cone elements and is not likely to cause excessive wear of the cone elements or detrimentally affect action of drills. This is important because of the tendency in some work for drills to chatter or jam, such tendency being increased by any vibrations transmitted through the driving connections.

An important aim of the invention is to present a drill press of this kind with combined variable transmission which may be constructed at a very low cost, not exceeding that of ordinary belt transmissions and pulleys adapted to attain the same range of ratio variation, while at the same time attaining improved results in greater rapidity of adjustment and speed, greater safety, less effort to drive on the part of the operator, obviating necessity for the operator to leave the front of the drill press when changes of drive ratio are to be made, ordinarily.

Additional objects, advantages and features of invention reside in the construction, arrangement and combination of parts involved in the following description and accompanying drawings, or equivalent embodiments of the invention.

In the drawings,

Figure 2 is a top view of the drill head.

Figure 3 is a front view of the motor slide and drive.

Figure 1:
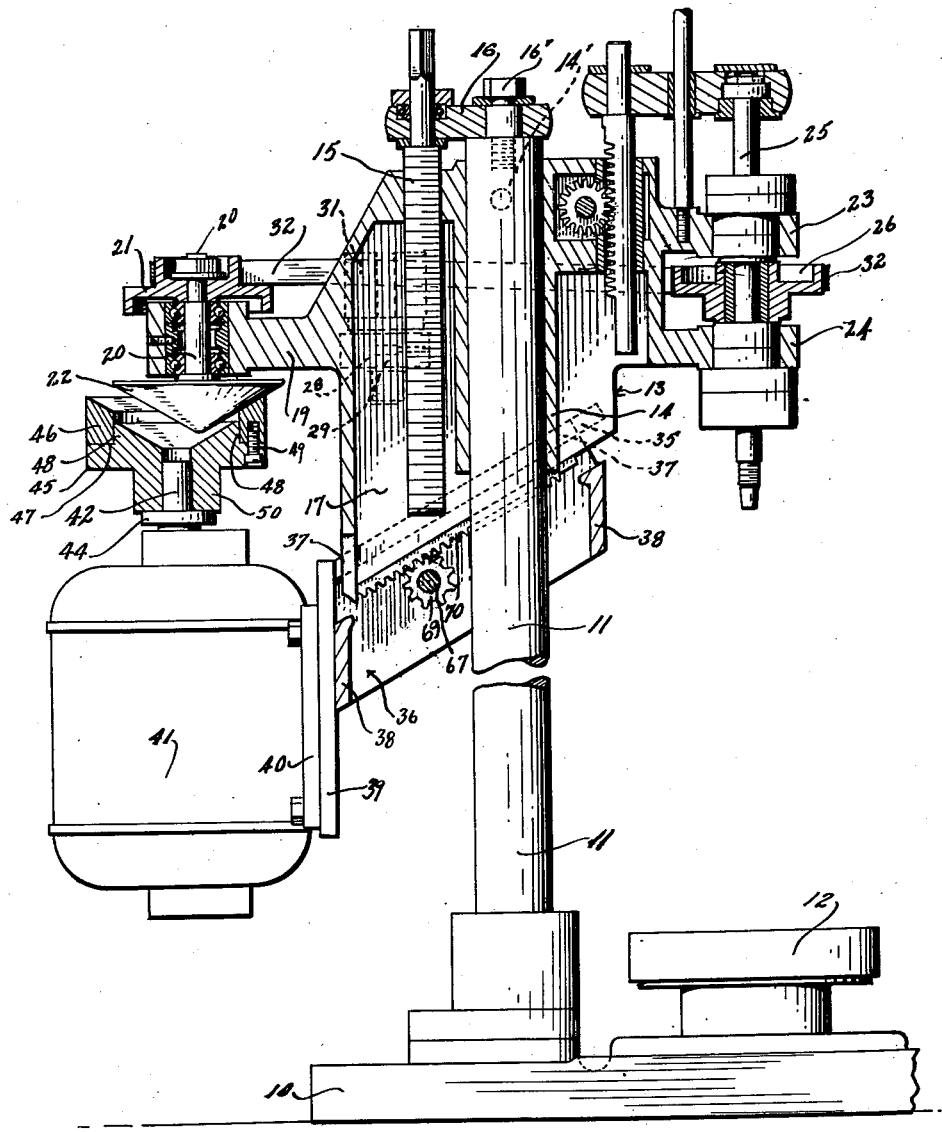
Figure 1 is a vertical sectional view of a machine constructed in accordance with my invention.

There is illustrated a drill press comprising a base 10 of conventional structure, on which a column 11 is erected in accordance with familiar practices; and any usual table devices may be provided at 12, as discretion may dictate. The column 11 is a steel cylinder, and has vertically slidable thereon a cross frame 13 of a drilling unit or head, the same including a sleeve portion 14 fitted snugly revolubly and slidably on the column 11 and having a conventional lock screw 14' at the right hand side of the drill unit to secure the frame in adjusted positions. The drill unit frame 13 is adjusted on the column 11 by means of a vertical elevating screw 15 at the rear of the column, threaded in a suitably thickened top portion of the frame and swivelled in a link 16 pivoted upon the upper end of the column 11 and secured by a cap screw 16'. The screw 15 may be operated by a removable crank (not shown), as customary in such devices.

The drilling unit 13 includes right and left hand side walls 17 and 18, tangent to the sleeve 14 and formed integrally therewith, and with the thickened top portion in which the screw 15 is engaged. The frame 13 is provided with a rearwardly extending arm 19 in which a vertical shaft 20 is revolubly mounted on suitable anti-friction bearings, this shaft carrying at its upper end a driving pulley 21 of the two-step type, and having at its lower end a male cone member 22 fixed thereon, to be subsequently described. The walls 17 and 18 are joined at the forward side of the frame, and have projected forwardly further therefrom bearing arms 23 and 24 in which a chuck spindle 25 is mounted in approved antifriction bearings, and a two-step pulley 26 is engaged slidably on the spindle having splined coengagement therewith. Conventional means may be provided for raising and lowering the chuck spindle slidably in its bearing and pulley, these comprising no novel part of the present invention and therefore are not described in detail. Spindle feed is effected by means of a feed lever 27 located at the right hand side of the machine, operative through conventional connections. On the right hand wall 17 of the frame, slightly below the level of the pulleys 21 and 26, a boss or lug 28 and a step bearing is provided thereon, receiving the spindle 29 of a revoluble idler pulley mounting head 29′, horizontally elongated, and having at respective ends upstanding pins 30 on which respective idler rollers 31 are revoluble, receiving therebetween one reach of the belt 32 which is engaged on the pulleys 21 and 26. A torsion spring 33 is engaged around the spindle 29, having respective arms, one bearing against the side of the frame 13, while the other is engaged with the head 29′ tending to rotate this head 29′ in such manner as to take up any slack in the belt 32, and maintain the latter in proper tension between the pulleys 21 and 26.

The lower parts of the walls 17 and 18 terminate with diagonal lower edge portions, and formed on the lower sides of the walls there are thickened portions 34, in which grooves 35 are formed, inclined downwardly from the forward parts of the walls 17 and 18 toward the rear, in a plane which is parallel to an element of the cone 22, a projection of which intersects the axis of the column 11, said cone having its convex face presented downwardly. A motor slide or carriage 36 is provided, consisting of respective side walls suitably spaced to pass on each side of the column 11 and having upper portions arranged to move in close relation to the walls 17 and 18 at their thickened parts, each wall of the slide having an inwardly projecting rib 37 engaged snugly and slidably in the respective groove 35. The side walls of the slide are joined by integral transverse vertical connecting walls 38 at their rearward and forward parts, the upper edges of these connecting walls being at a level to lie below the side plates 17 and 18 of the frame 13. A vertical base plate 39 is secured to the lower end of the slide, and bolted to this are the foot flanges 40 of a motor field ring or case 41, constituting with conventionally assembled parts a motor, including a main shaft 42 on a vertical axis and extended above the motor.

The shaft 20, the mountings for the slide 36 and the position of the motor on the slide are so proportioned that, when the slide 36 is at or near the upper limit of its movement the motor shaft 32 will be alined with and coaxial with the shaft 20 and cone 22.

The motor shaft 42 is formed with a shoulder 43, on which there is set a washer or collar 44 and slidably splined upon the upper end of the shaft 42, over the collar 44, there is a female cone element 45, concentric with the shaft 42 and having a thickened hub receiving the latter. The essential cone element of the member 45 consists of a friction ring 46 set and secured on a body portion of the member 45, which includes an outermost seat face 47, bounded at the inner sides by a rib or shoulder 48 fitted within the ring 46 and serving to center the latter properly with respect to the shaft 42. The ring 46 is removably attached to the body portion by means of screws 49 engaged through the latter, although other constructions may be employed as found desirable. The ring 46 has a diameter equal to the diameter of the cone 22 at the base of the latter, and is maintained in constant frictional engagement with the cone 22 as will be subsequently described, so that when the slide 36 is at the lower limit of its movement and the motor in operation, the cone 22 will be driven at maximum and high speed, while when the slide is moved to its upper limit, it will be checked by engagement of the previously disengaged outer portion of the female cone against the base of the male cone 22, so that a continuous clutch bearing and engagement extending throughout the circumference of the two cones will then be established. The grooves 35 being in a plane parallel to the adjacent side of the cone 22, throughout movement of the slide, the ring 46 will be maintained in uniform engagement with the cone 22 by reason of this parallel movement.

Figure 4:
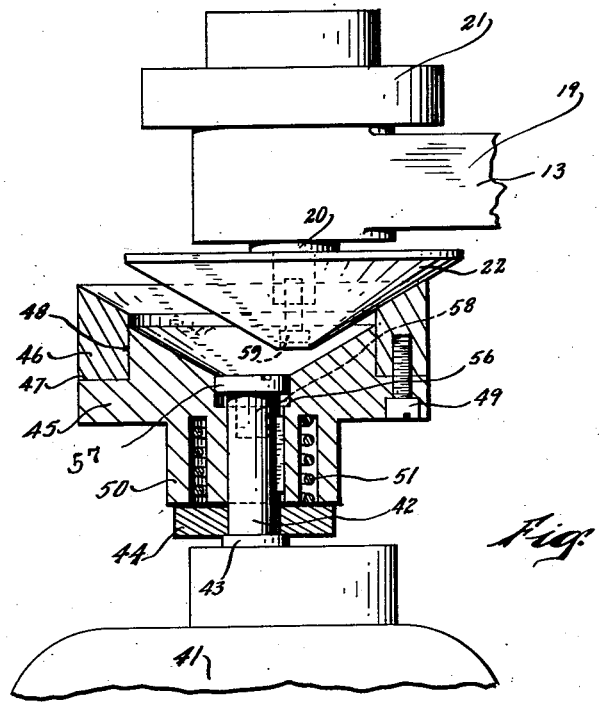
Figure 4 is an enlarged detailed sectional view of the cone transmission and upper portion of the motor.
Figure 5:
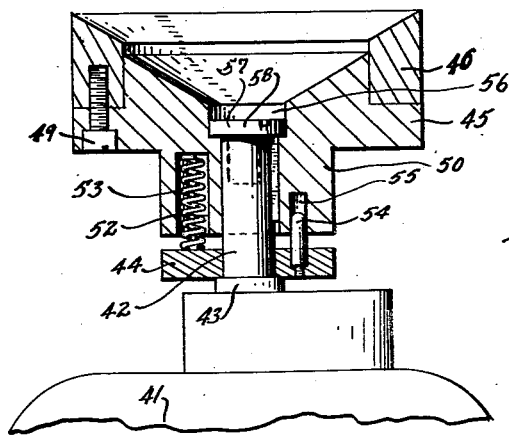
Figure 5 is a sectional view of a modified construction of the female cone element.

As shown in Figure 4, the cone 45 is supported resiliently with respect to the motor shaft, the hub 50 of the cone 45 being formed with a deep concentric channel therein, open on the lower face of the hub, and a helical spring 51 is set in this channel under compression between the collar 34 and the cone 45 so as to thrust the latter upward, holding the ring 46 in proper engagement with the cone 22. If desired, a plurality of small bores or sockets 52 may be formed in the hub of the cone member 45 and corresponding springs 53 of smaller diameter inserted slidably therein and confined between the collar 44 and cone 45, as in Figure 5. The collar 44 may be fixed on the shaft 42 in any approved manner, or may be connected to the hub of the cone 45, to insure rotation therewith by means of a pin 54, set in the collar and slidable in a corresponding bore 55 in the hub of the cone 45. If desired, the body of the cone 45 may be formed with a central recess at its upper side, affording a shoulder at 56, upon which may engage the head 57 of a retaining screw 58, having threaded engagement in the extremity of the motor shaft 42, although this screw is not essential, and may be omitted, if desired. The recess is made sufficiently deep so that the head 58 of the screw normally clears the shoulder 56 when the friction ring 46 is properly engaged with the cone 22. Thus, in case of dismounting the motor, the screw 58 will limit movement of the cone 45 toward disengagement from the shaft 42, maintaining the parts in proper assembly relation, and simplifying the return of the parts to normal mounting, as will be understood. The cone 22 in the present instance, is shown as having a threaded recess formed at its upper or base side, into which is screwed a threaded tenon on the lower end of the shaft 20, and to secure the cone 22 permanently in its mounting on the shaft, a retaining screw 59 is shown engaged through the apex of the cone and screwed into the tenon of the shaft 20. Other fastenings may be substituted for this purpose, as found desirable.

It will thus be seen that the spring mounting of the cone 45 on the motor shaft serves to maintain it in coengagement with the cone 22 throughout movement of the slide 36, and so that it will automatically compensate for wear, insuring proper driving relation thereof at all times.

This friction drive differs from prior practice in such drives in that the low speed of the driven member or cone 22 cannot be less than the speed of the motor. However, in drill presses of the type illustrated, speeds up to fifteen thousand revolutions per minute are required, and therefore, the machine has been found practical and useful for a large variety of work. Pulleys 21 and 26 have been made in stepped form, a two-step pulley being shown in each instance, in the present disclosure, although these may be varied, as found desirable.

With the parts proportioned approximately as shown, a very wide range of speeds has been found practicable, making it unnecessary to supply more than the one set of pulleys with a standard commercial product to meet the public demand.

The slide carrying the motor is made manually adjustable in the present instance, by means of a rotating knob 61, mounted revolubly at the right hand side of the slide near the rear, this knob having an externally cylindrical ferrule 62, engaged revolubly in a bearing boss 63 formed on the side wall 17 of the slide 36, this ferrule having a flange 64 at its inner side in which there is set a pin 65 presented toward the wall of the slide, and adapted to engage in one of a series of recesses 66 concentrically arranged about the bearing of the sleeve, so that at various positions of the knob 61 in its rotation, it may be secured against rotation by engagement of the pin 65 in one of the recesses 66. A shaft 67 is revolubly mounted in a step bearing 68 formed on the left side of the slide 36, this shaft having a rectangular cross section at its right hand end, engaged slidably in a corresponding opening through the ferrule 62, so that the latter is slidable upon the end of the shaft as well as in the bearing 63. Secured upon the shaft 67 there is a pinion 69, meshed with a rack 70 secured upon the lower inclined edge of the right hand wall 17 of the frame 13. A helical spring 71 is confined between the pinion 69 and the flange 64 on the ferrule of the knob 61, so that the knob is yieldingly held at the outer limit of its movement, and the pin 65 will thereby be kept in engagement with one of the recesses 66, whenever the knob is released, but yieldable to manual pressure on the knob so that the knob may thereby be freed for rotation and turned at the same time to move the slide as required in varying the ratio of transmission of motion from the motor to the driven cone 22. The knob 61 being mounted upon the slide enables the operator to apply pressure laterally upon the knob in the direction in which it is desired to move the slide, so that movement of the slide is thereby facilitated.

The invention constructed in approximately the proportions illustrated, which in Figure 1 is approximately one-third actual size, and using duplicate two-step pulleys as shown, of two inches and three and a half inches, respectively, in the two steps, and with the female cone ring 48 having a medial diameter of three and one-half inches (that is, a circle midway between the inner and outer boundaries of its conical face would be three and one-half inches in diameter), a range of speeds from 1000 revolutions per minute to 10,750 at the spindle have been secured, using a motor operating at 1750 revolutions per minute. With a one-eighth horse-power motor, the machine has been found highly satisfactory in drilling small holes from .004 of an inch to one-quarter of an inch in diameter, and is adapted to larger work with a more powerful motor.

The range of speeds indicated is obtainable without changing pulleys at all, and requiring but one shift of the belt, and one motor speed. The closest approximation of this range of speed with prior drill presses using step pulleys has required changes to the number of thirty-two steps, including changes of pulleys, and substitutions of motors of different speeds, using three-step pulleys in each of the several pulley changes. The device as constructed has the advantage that it is possible to provide a dial 72 of speeds, and a pointer 73, one on the speed changing knob 61 and the other on the side wall of the frame 13. As shown, the dial includes two sets of numbers, two numbers at each stage, one to indicate speeds for one position of the belt, and the other related to the other position of the belt.

It should be apparent from the Figure 1, that with the female cone concentric with the male cone and the motor turning at 1750 revolutions per minute when the belt is engaged on the upper two-inch-diameter-step of the pulley 21 and on the three and a half inch diameter upper step of the pulley 26, the latter and the spindle will be rotated at approximately 1000 revolutions per minute, the low speed above mentioned. With this same positioning of the belt, when the motor unit is shifted to bring the friction ring 46 to a track of ¾ of an inch diameter on the male cone the speed of the spindle will be multiplied to approximately 3600 revolutions per minute. However, as such speed would often be used in many instances with bits or work requiring more effective frictional bearing between the female and the male cone than is obtained at such short radius on the male cone, it is not obligatory for such speed of the spindle to use this limited radius of bearing on the male cone member, but the member 46 may be returned to concentric engagement with the member 22, and the belt shifted to the lower steps of the pulleys, where the initial low speed of the spindle would be slightly over 3000 revolutions per minute. Because the maximum speeds are ordinarily employed with small bits or soft work, the shift of the lower cone to a bearing on a track of three quarters of an inch in diameter on the male cone would be more effective, and this would give a theoretical speed of approximately 10,750 revolutions per minute with the belt in the lower position. There is thus some lap in the speeds obtained with the two positions of the belt, so that in the range of speeds from 3000 to 3600 revolutions per minute a change of belt is not obligatory and may be dispensed with where an occasional operation on hard material or with a relatively large bit for the speed is involved. Also, it is made possible to obtain a very powerful drive at an intermediate high speed for relatively large bits, when desired, by using the belt at the lower position and the cones in or near coaxial engagement.

One of the commercially available prior machines of the most advanced type, uses four sets of 2-step pulleys, and a two-speed motor, to attain a range of speed of 750 revolutions to 8,750 revolutions per minute. At one speed this particular motor makes 1725 turns per minute, while at the other speed it operates at 3500 revolutions per minute.

Figure 8:
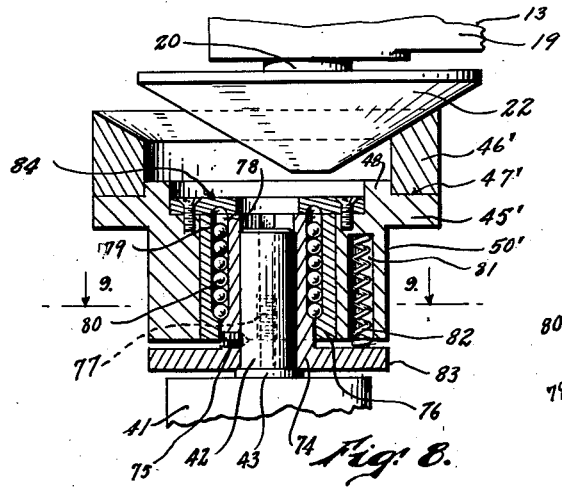
Figure 8 is a longitudinal section of a preferred construction of the female cone mounting.
Figure 9:
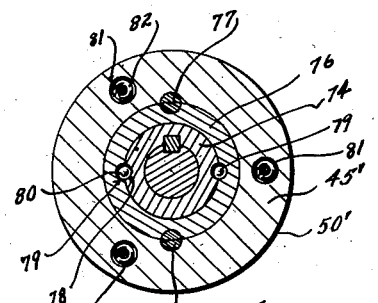
Figure 9 is a section on the line 9—9 of Figure 8.
Figure 6:
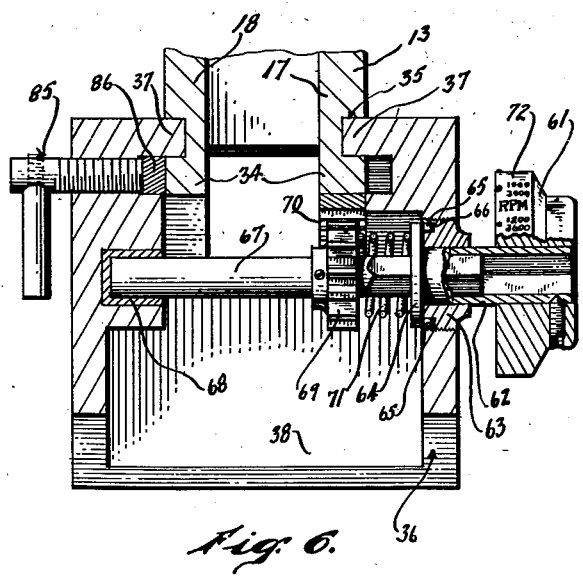
Figure 6 is a vertical cross section transverse to the path of the slide, showing the means for moving the slide and securing it at adjusted positions.
Figure 7:
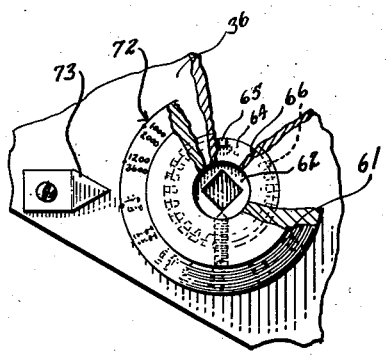
Figure 7 is a fragmentary elevation thereof with parts broken away.

A preferred mounting of the female cone is illustrated in Figures 8 and 9, wherein the motor 41 and its shaft 42, may be as before described, the shoulder 43 being shown on the motor shaft. Keyed conventionally on the end of the shaft, there is a hardened flanged sleeve 74, secured against longitudinal movement on the shaft by a set screw 75. The upper part of the female cone element 45' is constructed the same as before described, corresponding parts being indicated by the same reference numerals with the additional prime mark. The hub 50' however, is somewhat larger in diameter, so that it may receive therewithin a hardened sleeve or bushing 76 secured by longitudinal key pins 77 set in opposed grooves in the sleeve and hub, or otherwise fastened in the hub, and fitted slidably to the sleeve 74. The sleeves 74 and 76 are formed with registering longitudinal grooves 78 and 79 in any suitable number, and stopping short of the lower end of the sleeve 76, but opening through the upper ends of the two sleeves. In these registered grooves there are fitted revolubly ball bearings 80 in a number to leave some space at either end of each pair of alined grooves, as may be seen in Figure 8. These balls may thereby serve as splines to key the cone to the shaft of the motor, and under torque, longitudinal movement of the cone on the motor shaft is made easier than by use of the ordinary key. The hub 50' has formed in its outer part a number of bores 81 opening on the lower end of the hub, in which there are set respective helical springs 82, under compression between the flange 83 of the sleeve 74 and the inner ends of the bores. The springs 82 serve to support the female clutch member and hold it yieldingly in engagement with the male cone 22. If desired, a screw corresponding to the one 58 may be used in this form of the cone structure also, to limit upward movement of the hub on the shaft 42. Over the upper ends of the grooves 78 and 79 a retainer ring 84 may be secured to the hub or the sleeve 74 to prevent escape of the balls 80, the hub being suitably recessed to receive the ring.

To secure the slide 36 firmly in adjusted positions and to prevent accidental movement thereof, a slide lock means is provided, consisting of a hand screw 85 engaged through the left hand wall of the slide in alinement with the edge portion of the wall 18 of the frame 13 immediately below the groove and rib 35—37. A recess is formed in the slide alined with this part of the cross frame wall and a shoe 86 disposed therein against which the screw 85 bears.

It will be understood that the structure illustrated and described herein is purely exemplary, and that many changes in construction and arrangement, and proportions of parts as well as substitution of other specific means than those here represented may be made without departing from the spirit of the invention, as more particularly set forth in the appended claims.

I claim:

1. The known combination of a vertical drill spindle and changeable speed driving means including a vertical drill countershaft and shiftable belt connection therefrom to the spindle and in which the said spindle is mounted at the forward part of a head frame vertically slidable upon a support post: characterized by a fixed mounting for the countershaft at the rear of the head, a stepped pulley at a fixed level on the spindle, and an inversely stepped similar pulley on the countershaft having a permanent mounting in alinement with the first pulley, a separate driving unit including a carriage having side members extending forwardly beside the post and mounted slidably on the head, a motor mounted on the rear part of the carriage having a vertical shaft positioned to aline with the countershaft at the extreme forward position of the carriage, a male cone on one of the last named two shafts, and a female cone on the other, the path of the carriage coinciding with the medial forward element of the male cone, and means to releasably secure the carriage in adjusted positions on the head.

2. The known combination of a vertical drill spindle and changeable speed driving means including a vertical countershaft and shiftable belt connection therefrom to the spindle and in which the said spindle is mounted at the forward part of a head frame vertically slidable upon a support post characterized by a fixed mounting for the countershaft at the rear of the head, a stepped pulley at a fixed level on the spindle, and an inversely stepped similar pulley on the countershaft having a permanent mounting in alinement with the first pulley, a separate driving unit including a carriage having side members extending forwardly beside the post and mounted slidably on the head, a motor mounted on the rear part of the carriage having a vertical shaft positioned to aline with the countershaft at the extreme forward position of the carriage, a friction drive member on one of the last named two shafts with the elements of its friction face extending radially from its axis and a friction driven member on the other of the last named two shafts and mounted for relative radial sliding movement on the first friction member by movement of the carriage slidably in its mounting on the head, and means to fix the carriage in adjusted positions on the head.

3. In the known combination of a drill spindle and changeable speed driving means wherein a parallel countershaft is mounted parallel to the spindle, a stepped pulley on the spindle, an alined inversely stepped pulley on the countershaft and a shiftable belt on the pulleys; the combination of a primary driving shaft parallel to said countershaft, a male cone on one of said shafts and a female cone on the other and slidably engaged with the male cone, a carriage and guide mounting for the primary shaft movable in a path for constant contact movement of the female and male cones relatively from coaxial relation to axially spaced relation, means to drive the primary shaft and means to move the carriage in said guide, the radius of the said cones and the diameters of the steps of the pulleys being such that, with the belt on one alined set of steps of the pulleys the speed in the spindle produced by movement of the carriage to its limit in one direction approximates that speed produced in the spindle while the carriage is at the opposite limit of its movement and the belt engages on the next adjacent set of alined steps of the pulleys.

FREDERICK W. SCHLICHTER.